US012176598B1

(12) United States Patent
Ramirez

(10) Patent No.: US 12,176,598 B1
(45) Date of Patent: Dec. 24, 2024

(54) ASSEMBLY FOR MOUNTING MOBILE RADIO ANTENNA SYSTEMS

(71) Applicant: Fernando Ramirez, Pittsburg, CA (US)

(72) Inventor: Fernando Ramirez, Pittsburg, CA (US)

( * ) Notice: Subject to any disclaimer, the term of this patent is extended or adjusted under 35 U.S.C. 154(b) by 174 days.

(21) Appl. No.: 17/966,617

(22) Filed: Oct. 14, 2022

Related U.S. Application Data

(60) Provisional application No. 63/270,691, filed on Oct. 22, 2021.

(51) Int. Cl.
*H01Q 1/12* (2006.01)

(52) U.S. Cl.
CPC ................................ *H01Q 1/1228* (2013.01)

(58) Field of Classification Search
None
See application file for complete search history.

(56) References Cited

U.S. PATENT DOCUMENTS

| | | | | |
|---|---|---|---|---|
| 6,431,885 | B1 * | 8/2002 | Stroup | H01R 4/64 439/798 |
| 10,724,655 | B2 * | 7/2020 | Bell | H02G 3/32 |
| 10,797,380 | B2 * | 10/2020 | Roy | H01Q 1/1228 |
| 2020/0185827 | A1 * | 6/2020 | Kaistha | H01Q 1/1228 |
| 2021/0190237 | A1 * | 6/2021 | Bell | H02G 3/263 |
| 2022/0140466 | A1 * | 5/2022 | Kim | H01Q 1/1228 343/702 |

FOREIGN PATENT DOCUMENTS

| | | | |
|---|---|---|---|
| CN | 112310601 A * | 2/2021 | H01Q 1/1228 |

OTHER PUBLICATIONS

"Polymer and Plastic Composites Information", captured from Wayback Machine in Apr. 2021, GlobalSpec website (Year: 2021).*

* cited by examiner

*Primary Examiner* — Dameon E Levi
*Assistant Examiner* — Anh N Ho
(74) *Attorney, Agent, or Firm* — Barry Choobin; Patent 360

(57) ABSTRACT

An assembly for installing mobile radio antenna systems that do not cause any passive intermodulation interferences. The assembly includes brackets for clamping around conduits, support bars, support plates, arms, frame, and the like for coupling different components of the mobile radio antenna system. The brackets, threaded rods, threaded bolts, hex nuts, and the like of the assembly are made from plastic to avoid generating interferences.

4 Claims, 10 Drawing Sheets

ASSEMBLY FOR MOUNTING MOBILE RADIO ANTENNA SYSTEMS

CROSS-REFERENCE TO RELATED APPLICATIONS

This application claims priority from a U.S. Provisional Patent Appl. No. 63/270,691 filed on Oct. 22, 2021, which is incorporated herein by reference in its entirety.

FIELD OF INVENTION

The present invention relates to an assembly for installing mobile radio antenna systems, and more particularly, the present invention relates to an assembly for mitigating passive intermodulation interference in mobile radio antenna installations.

BACKGROUND

Passive intermodulation interference (PIM) is a significant issue in the cellular industry. The interference can negatively affect the operation of different components. The interference can affect different components of the mobile radio antenna. Interference may arise due to number of reasons, such as loose cable connections, incompatible interfaces, and the like.

A need is therefore appreciated to an assembly for installing mobile radio antenna systems and mitigating any PIM.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an assembly for installing a mobile radio antenna system without PIM.

It is another object of the present invention that the assembly makes the installation process easier.

An assembly for installing mobile radio antenna systems that do not cause passive intermodulation interference, the assembly comprises a bracket, the bracket has a first member and a second member, wherein the first member and the second member have inner curvatures, wherein the first member and the second member are configured to clamp around a conduit securing the conduit, the bracket is made from plastic; and one or more fasteners for securing the first member to the second member, wherein the one or more fasteners are made of plastic. The one or more fasteners comprise threaded bolts. The one or more fasteners comprise threaded rods, washers, and hex nuts. The assembly further comprises one or more arms, each of the one or more arms is hollow and cuboidal in shape, each of the one or more arms has slots dispersed throughout an area of the arm, wherein the one or more arms are made of plastic material. The one or more arms comprise a plurality of arms that form a frame. The plurality of arms comprises three arms coupled to each other to form a U-shape frame. The plurality of arms comprises two arms coupled to the bracket using threaded rods, the two arms run parallel to each other and in a same direction. The assembly further comprises a support plate, the support plate has slots dispersed throughout an area of the support plate, wherein the support plate is made of plastic. The assembly further comprises a support bar, the support bar has slots dispersed throughout an area of the support plate, wherein the support plate is made of plastic.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
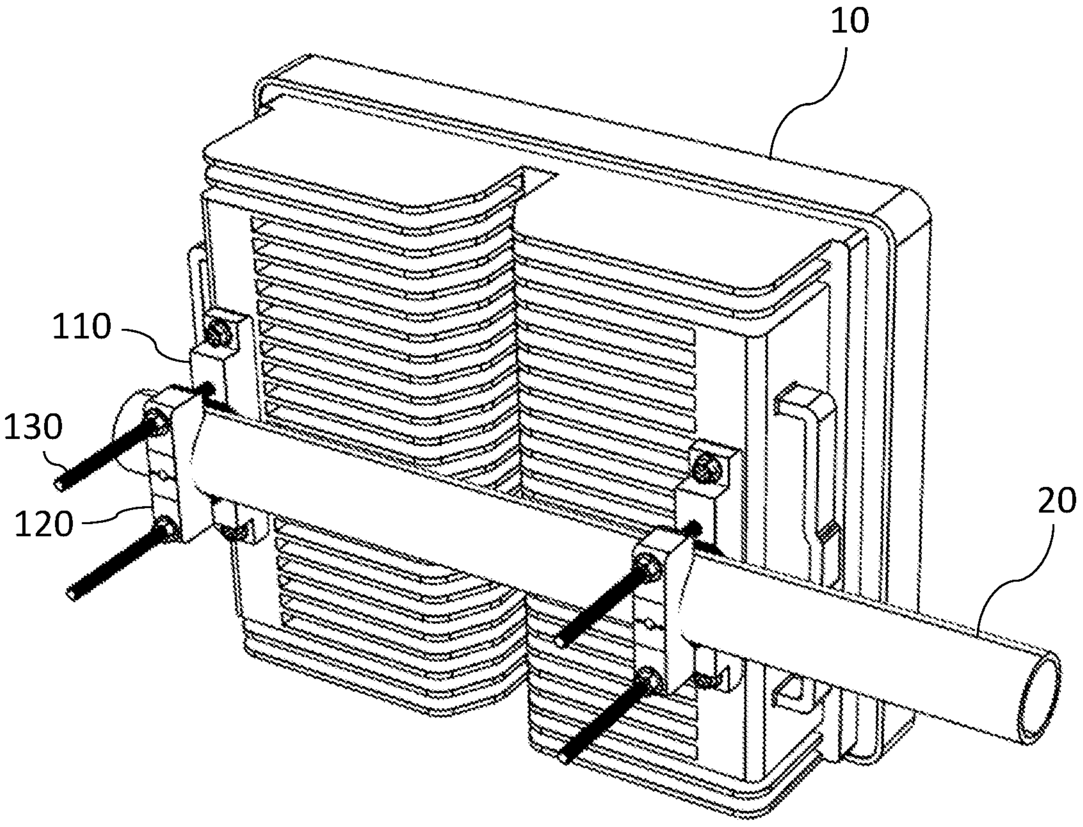
FIG. 1 is a perspective view of an embodiment of the assembly shown in an installed state, according to the present invention.
Figure 2:
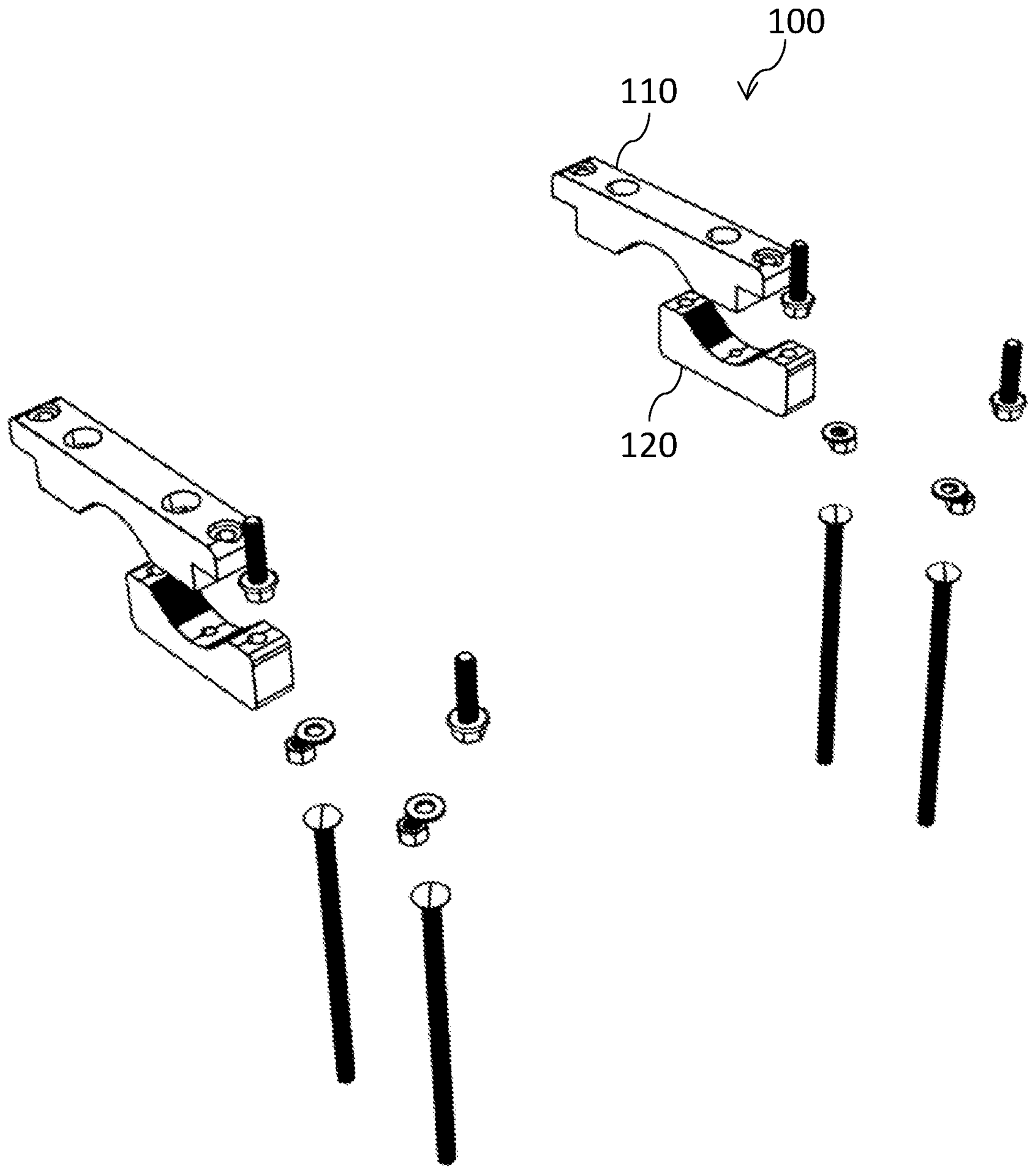
FIG. 2 is an exploded view of the assembly shown in FIG. 1, according to the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting of embodiments of the invention. As used herein, the singular forms "a", "an" and "the" are intended to include the plural forms as well, unless the context clearly indicates otherwise.

It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be outlined in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is an assembly for installing mobile radio antenna systems that do not cause passive intermodulation interference. The disclosed assembly can be used to mount different components of a mobile antenna system. The disclosed assembly can be made from engineered plastic that does not cause PIM. The disclosed assembly can be engineered to endure mechanical tilting, vibrations, and harsh weather conditions. Unlike, the conventional assemblies, the disclosed assembly does not have any metal-metal or metal-plastic components, thus eliminating any interference. The disclosed assembly can include multiple and varied sizes of cable support blocks, plastic support plates designed to hold multiple snap-in hangers, plastic support rails as an anchor rail being formed as a U-shaped channel made from plastic that allows to mount multiple cable hanger devices and/or snap-in hangers. The assembly includes different mounting components for Radio Transceivers and RF Antennas as shown in FIGS. 1-10. FIG. 1 shows an antenna unit 10 mounted using an exemplary embodiment of the present invention. The assembly 100 includes a radio bracket 110 and a coupling bracket 120. Two carriage bolts 130 are used to couple the radio bracket to the coupling bracket. Suitable washers and hex heavy nuts can be used to fasten the two carriage bolts. Two hex bolts can be used to secure the antenna unit 10. The two brackets can further secure a conduit 20 as shown in FIG. 1.

Figure 3:
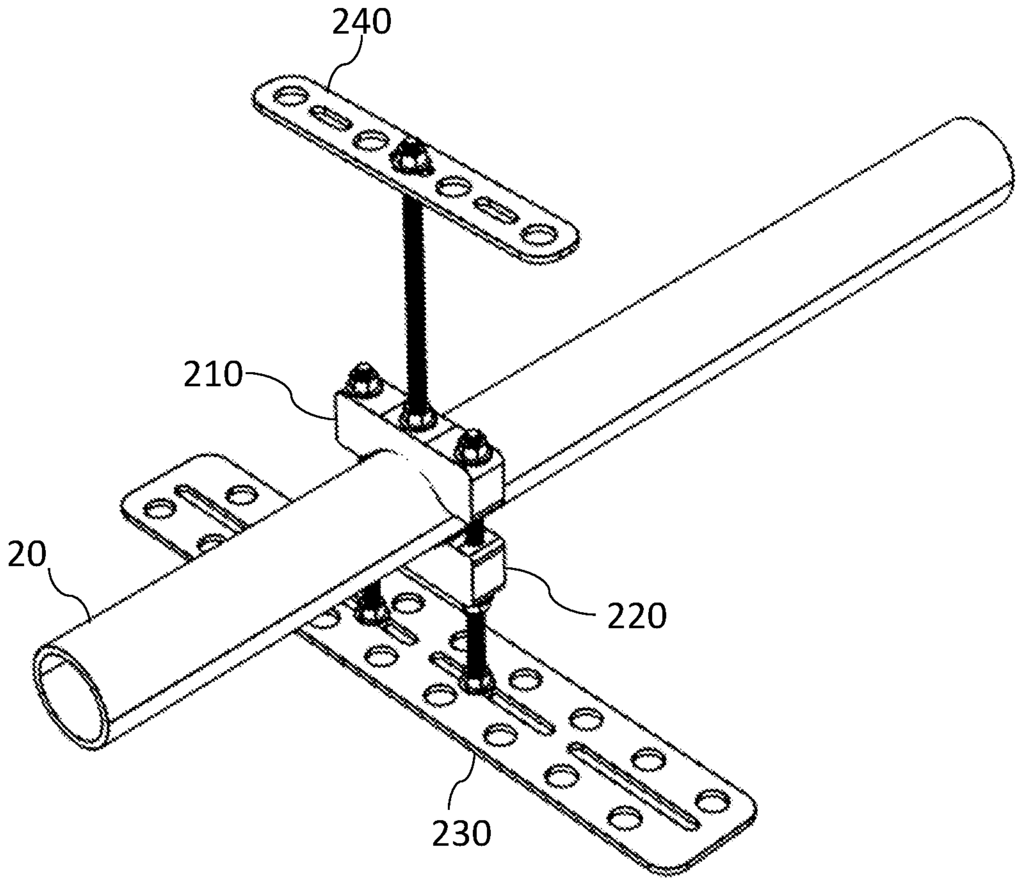
FIG. 3 is a perspective view of another embodiment of the assembly shown in an installed state, according to the present invention.
Figure 4:
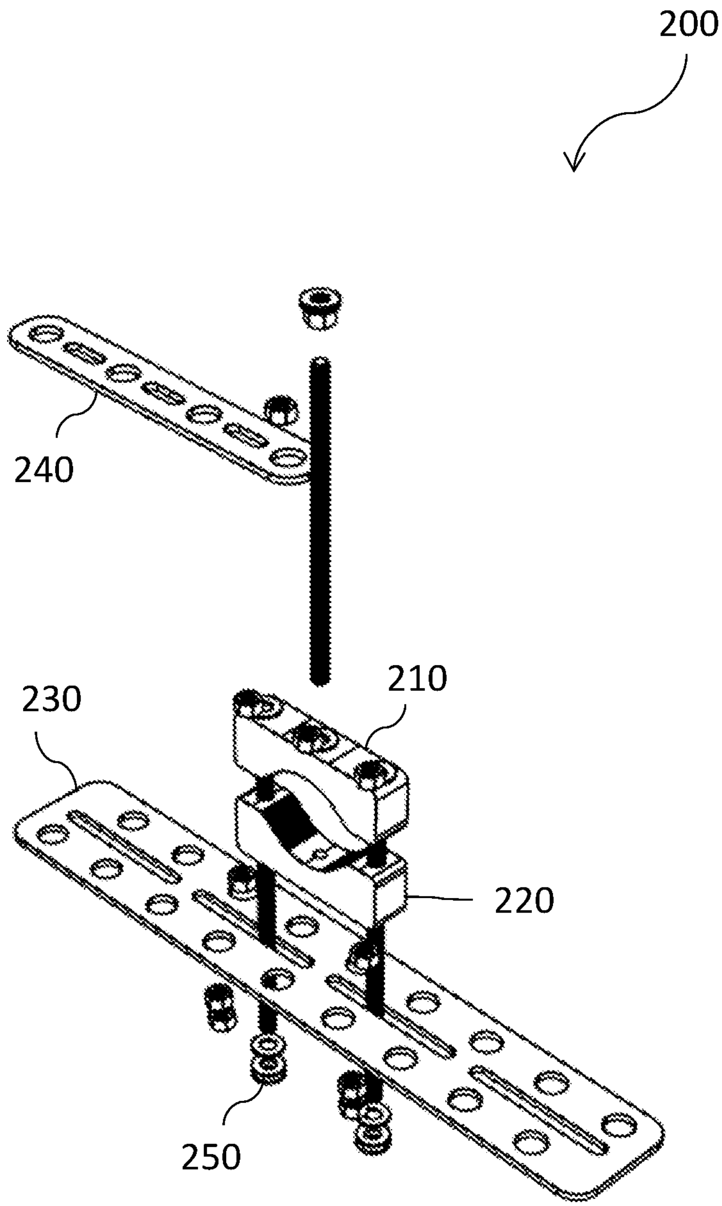
FIG. 4 is an exploded view of the assembly shown in FIG. 3, according to the present invention.

Referring to FIGS. 3 and 4 which show another embodiment of the disclosed assembly. The assembly can be used to mount different components of the radio antenna system to the support plate and the support bar. As shown in FIG. 3, the two members 210 and 220 of the bracket can secure conduit 20, a support plate 230 and a support bar 240 can be coupled to the bracket. The bracket is similar to a clamp, wherein the two members have a concave inner surface that can receive the cylindrical conduit 20. Exploded view of the assembly is shown in FIG. 4, the assembly 200 has a bracket with two clamping members 210 and 220, a support plate 230, and a support bar 240. Two threaded rods, suitable washers, and hex nuts 250 can be used to couple the support plate to the bracket. Another threaded rod can be used to couple the support bar to the bracket.

Figure 5:
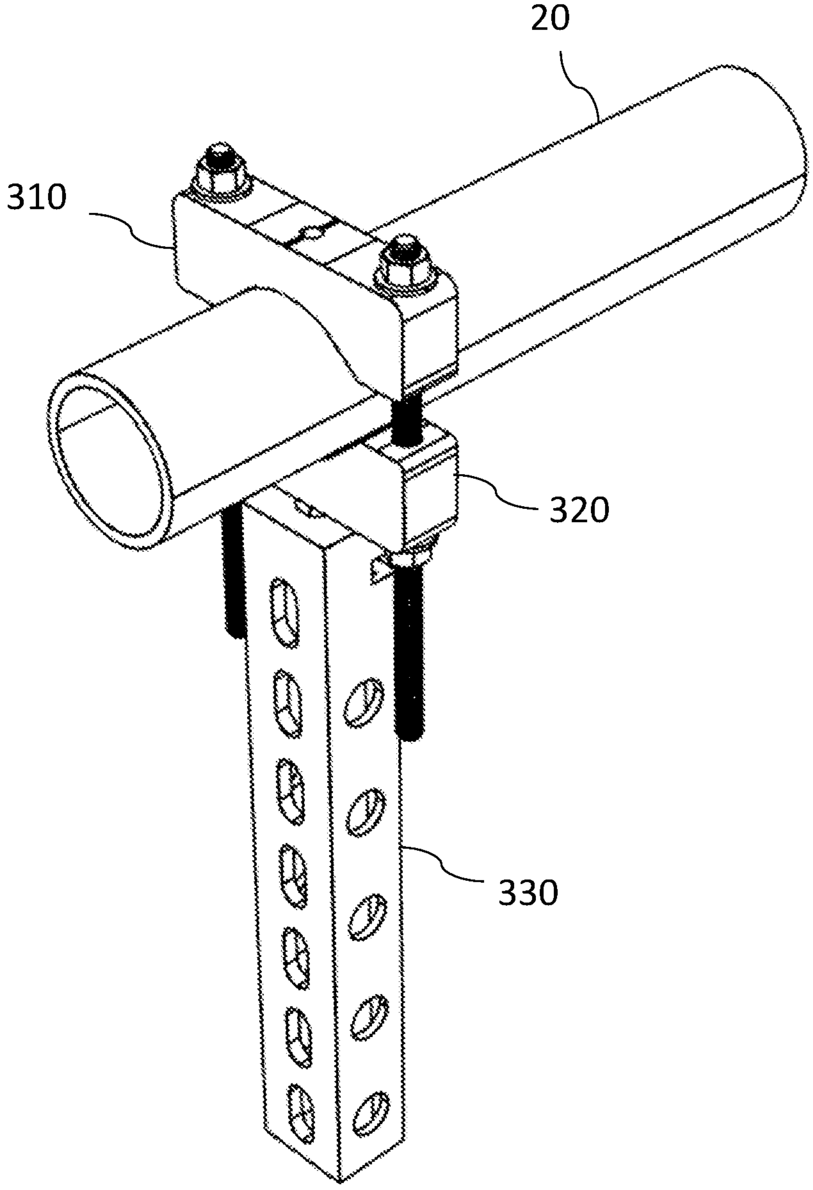
FIG. 5 is a perspective view of another embodiment of the assembly shown in an installed state, according to the present invention.
Figure 6:
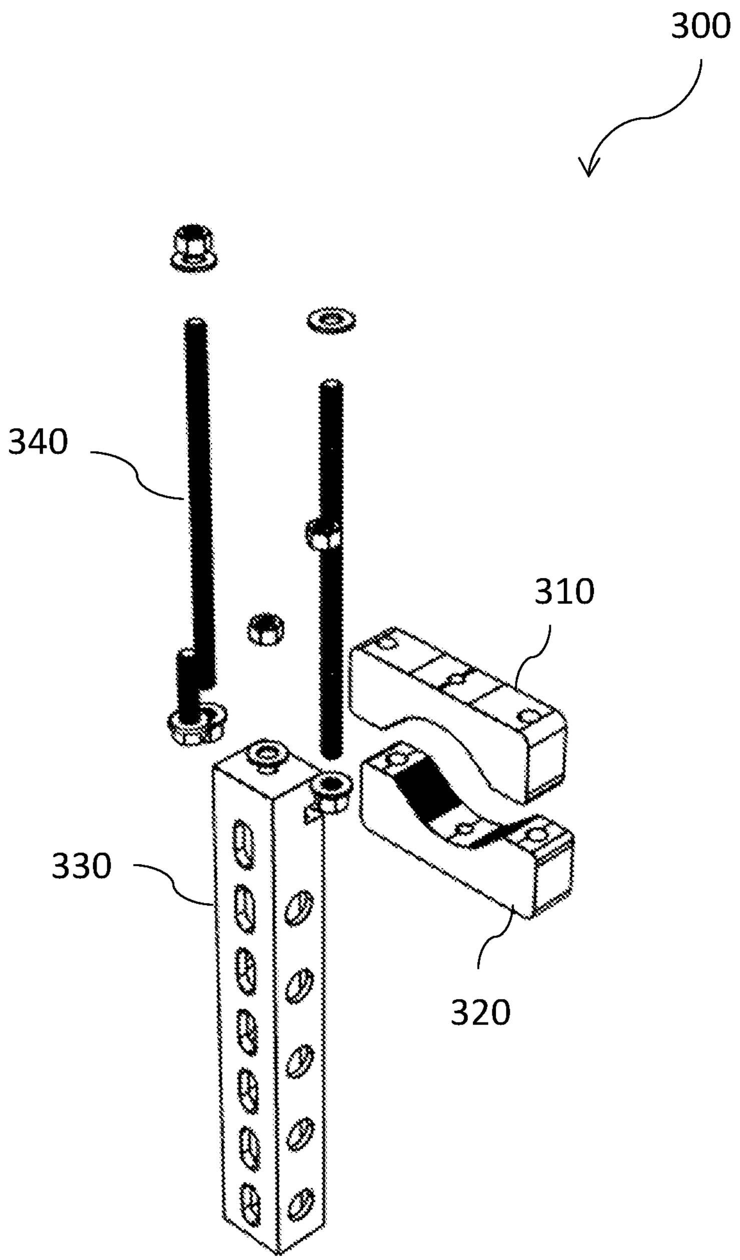
FIG. 6 is an exploded view of the assembly shown in FIG. 5, according to the present invention.

Referring to FIGS. 5 and 6 show another exemplary embodiment of the assembly 300 for installing the mobile antenna systems. The assembly 300 can include rail 330 for mounting desired components of the antenna system. Two bracket members 310 and 320 can secure a conduit 20 as shown in FIG. 5 and the rail 330 can be coupled to bracket member 320. FIG. 6 shows an exploded view of assembly 300 in which the two bracket members and a rail are shown. The bracket members can be coupled using two threaded rods 340 and hex nuts. The length of the rod and the curvature of the bracket member allow for securing conduits of different sizes.

Figure 7:
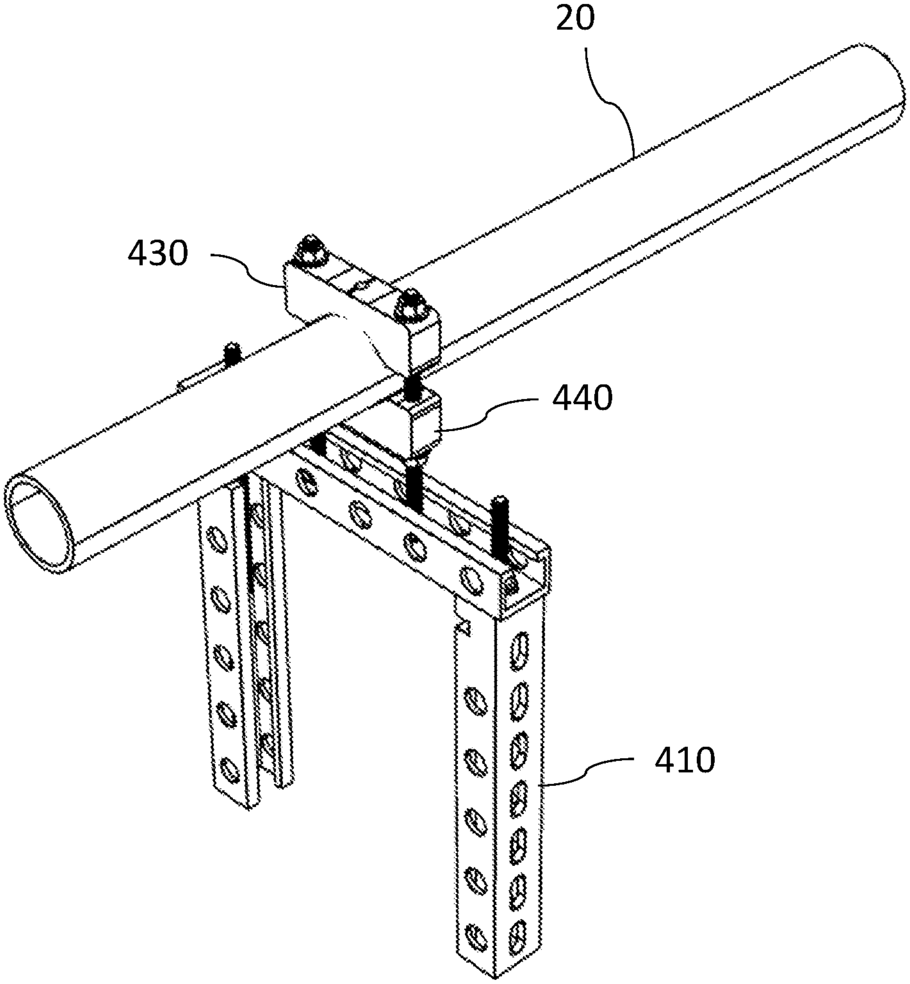
FIG. 7 is a perspective view of another embodiment of the assembly shown in an installed state, according to the present invention.
Figure 8:
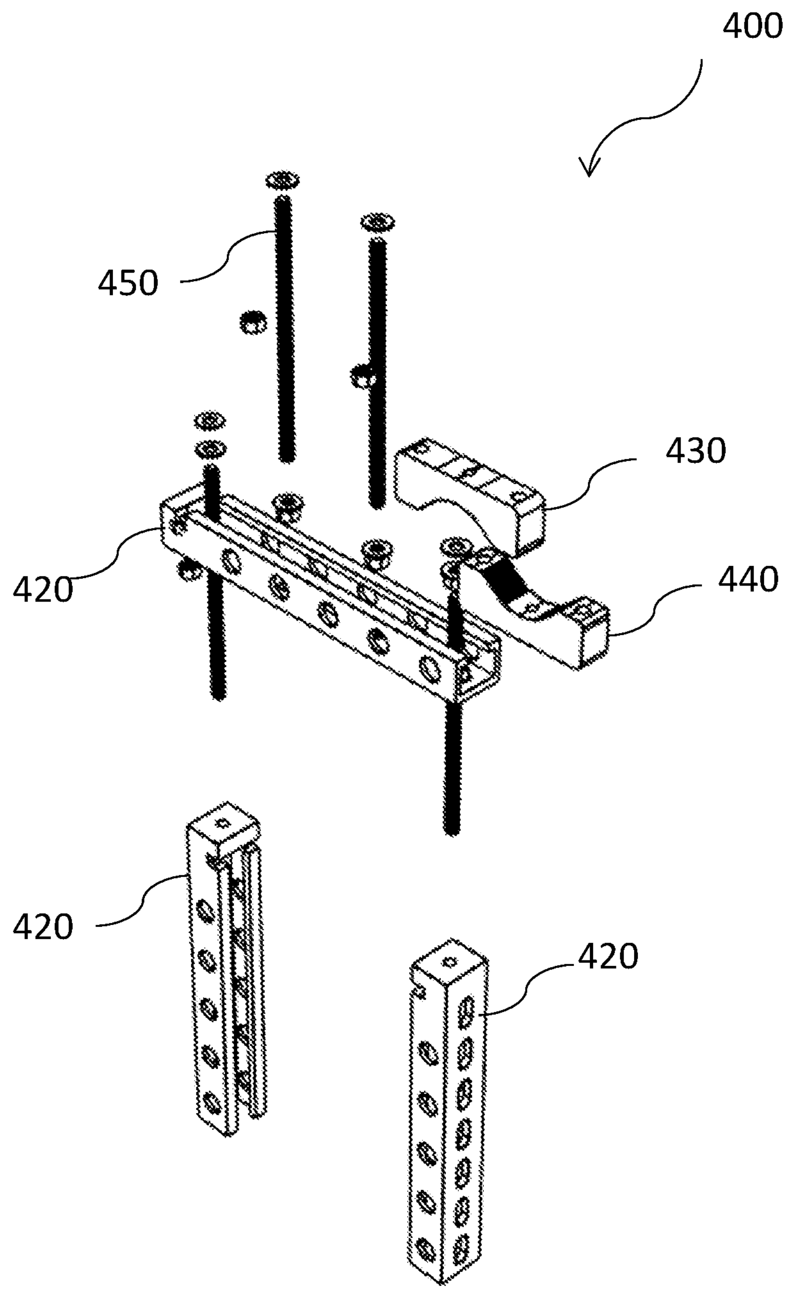
FIG. 8 is an exploded view of the assembly shown in FIG. 7, according to the present invention.

Referring to FIGS. 7 and 8 which show another embodiment of the disclosed assembly 400 that is having a frame 410 to mount different components of an antenna system. The frame 410 can be made from two or more rails 420 that can be joined to form a frame of the desired shape depending upon the intended utility. FIG. 7 shows a frame 410 made of three rails 420, joined end to end in a U-shape. The frame can be coupled to the two-member bracket i.e., first member 430 and second member 440 using threaded rods 450, and the bracket can secure the conduit 20. The three rails can be coupled using threaded rods and suitable washers and hex nuts.

Figure 9:
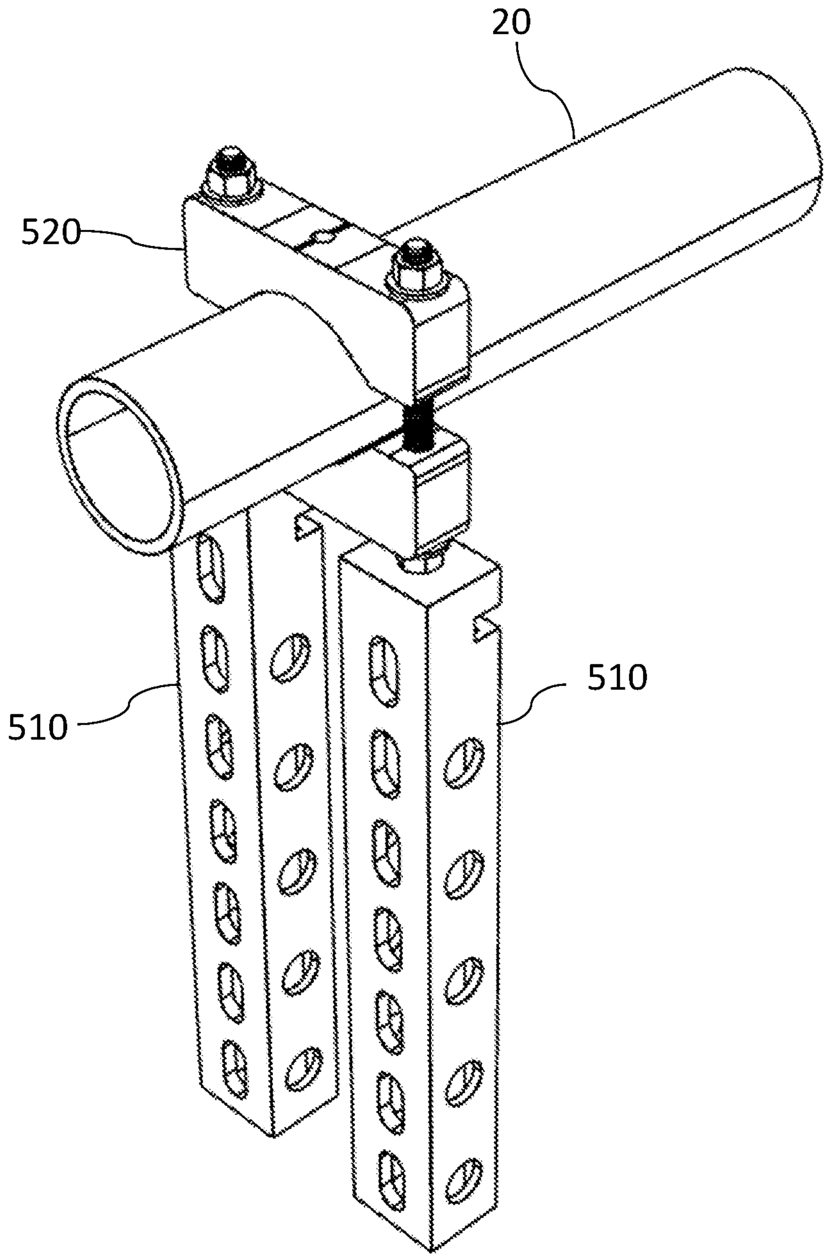
FIG. 9 is a perspective view of another embodiment of the assembly shown in an installed state, according to the present invention.
Figure 10:
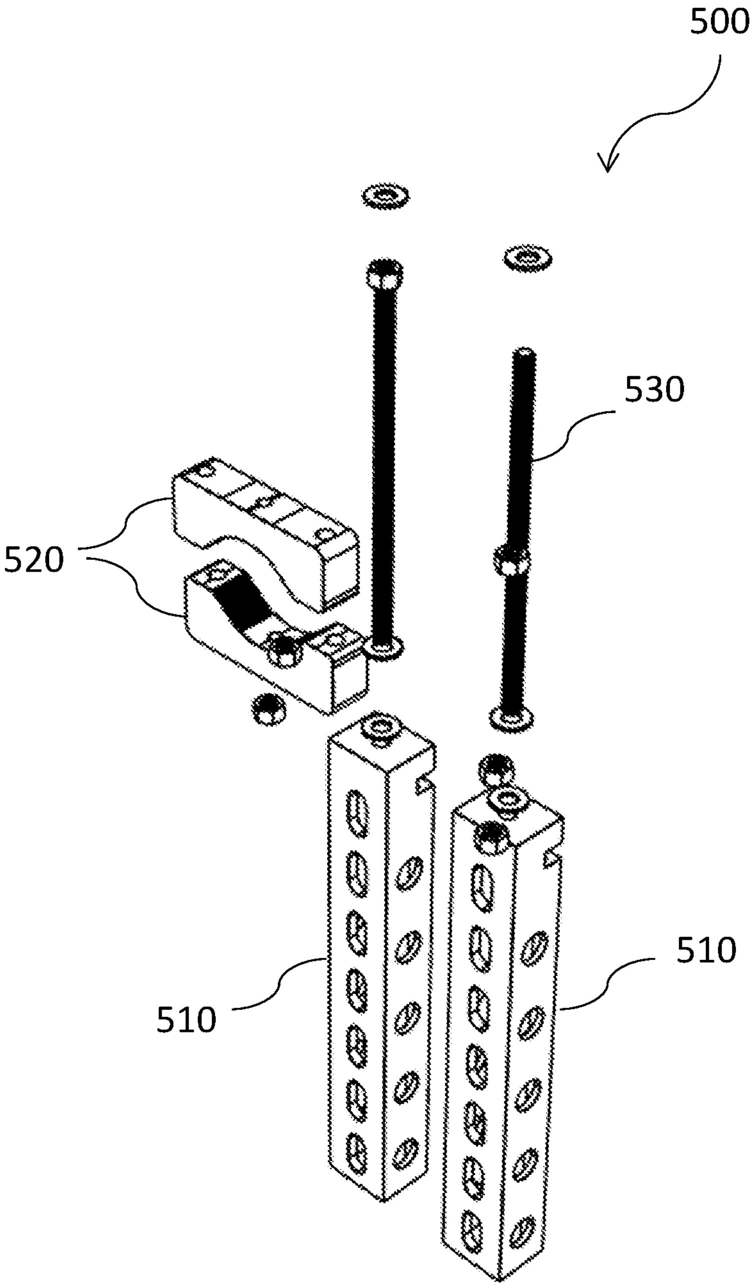
FIG. 10 is an exploded view of the assembly shown in FIG. 9, according to the present invention.

Referring to FIGS. 9 and 10 which show another embodiment of the disclosed assembly 500 that is having two rails 510 that run parallel to each other and are mounted to the bracket 520. The two rails 510 are mounted to a single face of the bracket 520 and are spatially apart from each other and run parallel to each other. The coupling brackets 520 can secure a conduit 20 wherein the two members of the brackets clamp the conduit. Hex nuts, washers, and threaded rods 530 can be used to couple the brackets members and the two rails.

The rails include multiple slots of different shapes and sizes dispersed throughout the surface of the rail. The drawings show the rail having round and elliptical slots. The rails, threaded rods, hex nuts, washers, and any bolts of the disclosed assembly can be made from engineered plastic that prevents or does not cause any interference, such as PIM. The disclosed assembly can be versatile and can be adapted for several types of installation.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An assembly for installing mobile radio antenna components that do not cause passive intermodulation interference, the assembly comprises:

a bracket, the bracket has a first member and a second member, wherein the first member and the second member have inner curvatures, wherein the first member and the second member are configured to clamp around a conduit securing the conduit, the bracket is made from plastic;

a plurality of fasteners for securing the first member to the second member; and three arms, each of the three arms is hollow and cuboidal in shape, each of the three arms has slots dispersed throughout an area of the arm, wherein the three arms are made of plastic material, the three arms are coupled to each other to form a U-shape frame, wherein one arm of the three arms is coupled to the second member.

2. The assembly according to claim 1, wherein the plurality of fasteners comprise threaded bolts.

3. The assembly according to claim 1, wherein the plurality of fasteners comprises threaded rods, washers, and hex nuts.

4. An assembly for installing mobile radio antenna components that do not cause passive intermodulation interference, the assembly comprises:

a bracket, the bracket has a first member and a second member, wherein the first member and the second member have inner curvatures, wherein the first member and the second member are configured to clamp around a conduit securing the conduit, the bracket is made from plastic;

a plurality of fasteners for securing the first member to the second member;

a support plate, the support plate has slots dispersed throughout an area of the support plate, wherein the support plate is made of plastic, wherein the slots in the support plate comprise rounded slots and elongated slots; and a support bar, the support bar has slots dispersed throughout an area of the support bar, wherein the support bar is made of plastic, wherein the slots in the support bar comprises round slots and elongated slots, wherein the support bar is smaller in size than the support plate, wherein one or more fasteners of the plurality of fasteners is configured to pass through an elongated slot in the support plate.

* * * * *